Dec. 2, 1952 D. McKENNA 2,619,857
DEVICE FOR APPLYING TIRE CHAINS
Filed April 6, 1948 2 SHEETS—SHEET 1

Inventor:
Denis McKenna,
by Thomson & Thomson
Attorneys

Dec. 2, 1952 D. McKENNA 2,619,857
DEVICE FOR APPLYING TIRE CHAINS
Filed April 6, 1948 2 SHEETS—SHEET 2
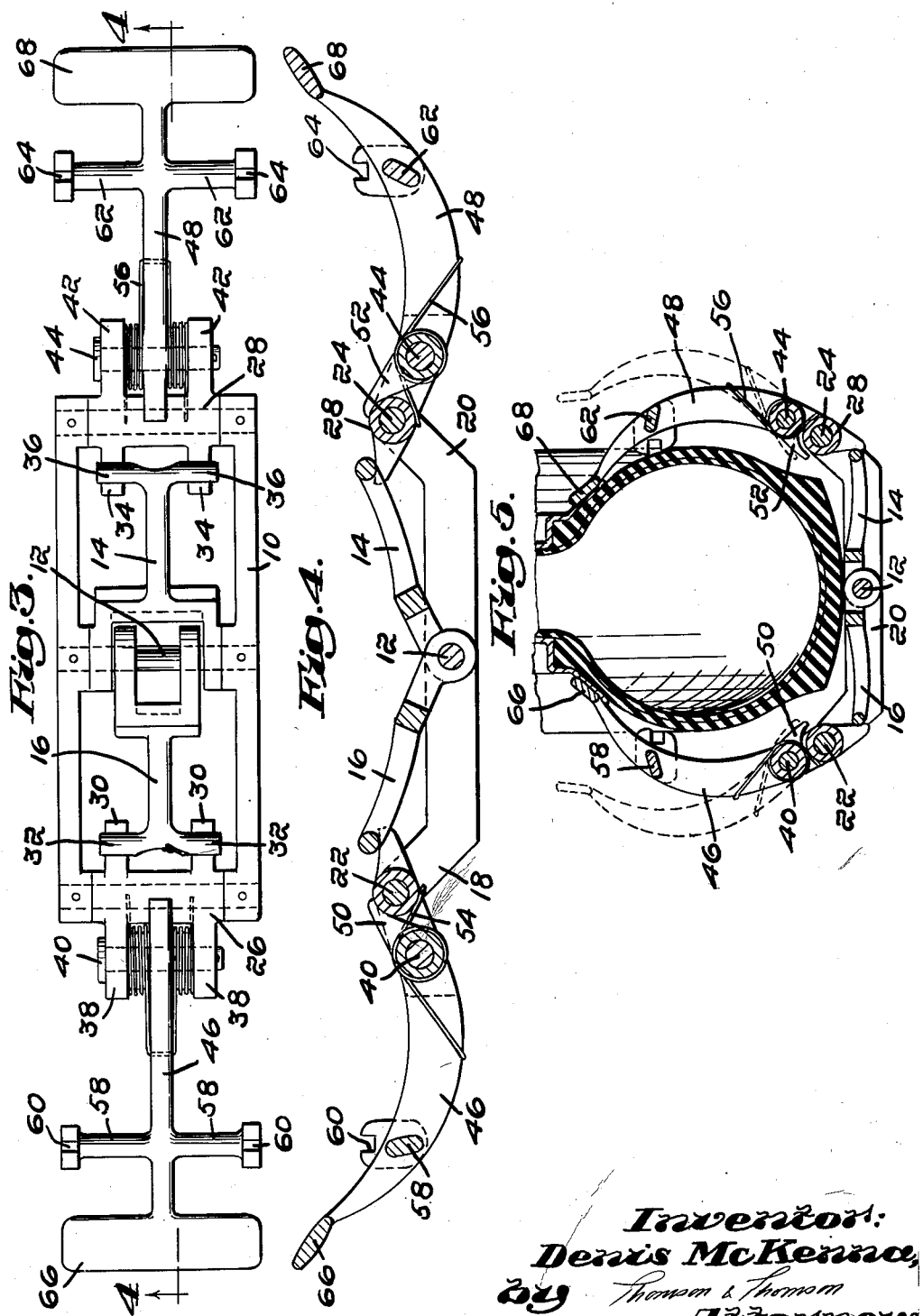
Inventor:
Denis McKenna,
by Thomson & Thomson
Attorneys Patented Dec. 2, 1952

2,619,857

UNITED STATES PATENT OFFICE 2,619,857

DEVICE FOR APPLYING TIRE CHAINS

Denis McKenna, Belmont, Mass.

Application April 6, 1948, Serial No. 19,367

4 Claims. (Cl. 81—15.8)

This application relates to improvements in a device for applying tire chains to the wheels of motor vehicles.

With the present design of motor vehicles, it is a difficult task to install tire chains unless the wheels are jacked up. There is a need for a simple device which will assist the operator in applying tire chains without the necessity of jacking up the wheels.

It is an object of my invention to provide a device for assistance in applying tire chains which will serve to grip the tire and hold one end of the tire chain while it is passed around the wheel by movement of the vehicle whereby the ends may then be readily attached.

Further objects and advantages of my improvements may be more readily apparent from the following description of a preferred embodiment thereof as illustrated in the attached drawings, in which;

Figure 3 is a plan view on an enlarged scale showing the tire gripping mechanism in open position;

Figure 4 is a vertical section taken on a plane indicated 4—4 in Figure 3; and

Figure 5 is a vertical section taken through the tire and showing the manner in which the gripping arms engage the tire.

Figure 1:
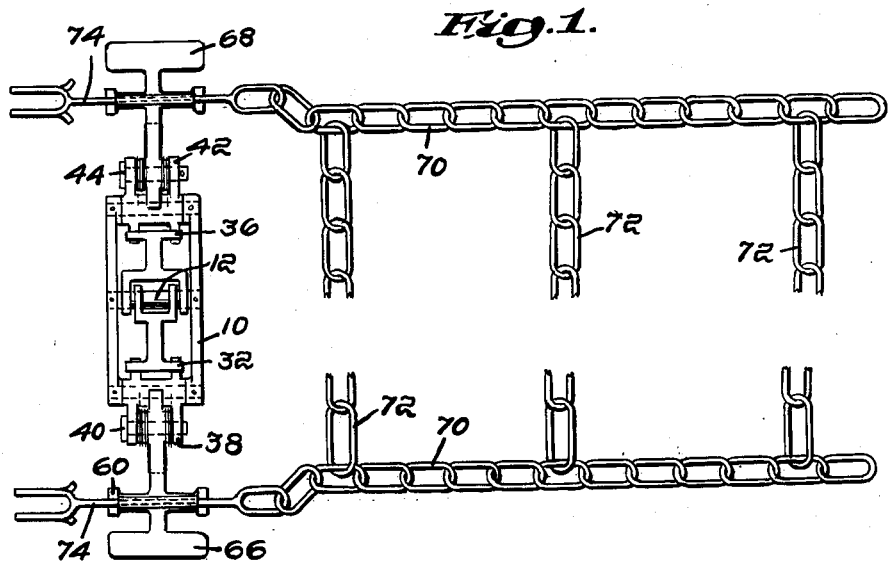
Figure 1 is a plan view of the device showing a portion of the chain laid in position.

Referring to Figures 1 and 4 there is illustrated a frame 10 in which is mounted a central pivot pin 12. Lever arms 14 and 16 are pivotally mounted by the pin 12. As shown in Figure 4, the end portions 18 and 20 of the frame 10 are upwardly inclined and there inclined ends support the pivot pins 22 and 24. Link members 26 and 28 are pivotally mounted by the pins 22 and 24. The link 26 has the inwardly directed fingers 30 which are engaged by the arms 32 of the lever 16. In a similar manner, the link 28 has the fingers 34 engaged by the arms 36 of the lever member 14. The lugs 38 of the link 26 carry a pivot pin 40, while, in a similar manner, the lugs 42 of the link 28 carry a pivot pin 44. The tire gripping arm 46 is pivotally mounted on pin 40, while the tire gripping arm 48 is similarly mounted on the pin 44. The lever arm 46 has a finger 50 which normally rests against the hub of link 26 and the arm 48 has a finger 52 which normally rests against the hub of link 28. A spring 54 is coiled around the pivotal mounting of the arm 46 on the pin 40 and the ends of the spring are so arranged as to exert a normal tension tending to hold the finger 50 in engagement with the hub of the link 26. The spring 56 associated with the arm 48 operates in a similar manner. The arm 46 has a pair of fingers 58 into which are cut the slots 60. The arm 48 has similar fingers 62 provided with the slots 64. The end of arm 46 has a plate 66 adapted to engage the side of the tire while the arm 48 has a similar plate 68.

In Figure 1, there is shown a portion of the tire chain comprising the side links 70 and the cross links 72. A pair of hook members 74 are fastened to one end of each row of side links 70 while the other ends are connected to the hooks 76, preferably through springs 78.

Figure 2:
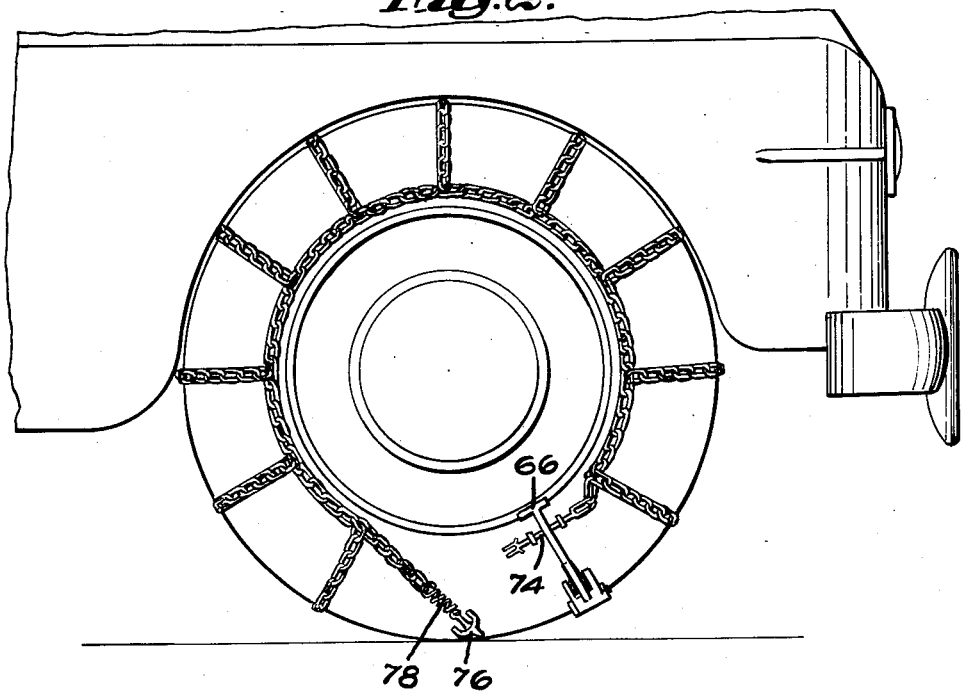
Figure 2 is a side elevation showing the motor vehicle wheel and the manner in which the chain is wrapped around the tire.

In use, the frame 10 is laid upon the ground immediately adjacent the wheel to which the chain is to be attached. The arms 46 and 48 are spread out as shown in Figures 1, 3 and 4. The hooks 74 are laid in the slots 60 and 64. The tire chain is laid out upon the ground, as shown in Figure 1. The vehicle is then backed over the frame 10. The weight of the car upon the lever arms 14 and 16 will cause these arms to be depressed to the position shown in Figure 5, thus swinging the arms 46 and 48 up to engage the sides of the tire. The link 26 and the arm 46 form a compound lever connected through the spring 54, thus when the plate portion 66 engages the side of the tire or wheel, the arm 46 moves with respect to the link 26 and takes care of a slight misalignment of the frame with respect to the vehicle. The hooks 74 are thereby held against the side of the tire, as shown in Figure 2, and as the vehicle continues to move rearwardly, the chain is wrapped around the tire. The vehicle is then stopped and the hooks 76 are engaged with the hooks 74. In order to release the frame 10 from the tire, it is only necessary to pull out the links 14 and 16, thus releasing the arms 46 and 48.

Various modifications may be resorted to in the commercial design of this equipment without departing from the spirit of my invention. It is believed to be new to provide a device which is automatically gripped on the tire to hold the end of the tire chain and which may be used with little trouble.

I claim:

1. In a device for applying tire chains, a frame, movable arms mounted on the frame arranged to grip a wheel, cam means movably mounted on said frame in position to engage said arms and operated by the pressure of the wheel to move and lock the arms in gripping position and means associated with the arms to hold one end of the tire chain and wrap it around the tire of the wheel as the vehicle is backed over the chain.

2. In a device for applying tire chains, a tread plate, a pair of lever arms pivotally mounted at the ends of the tread plate, tire chain engaging fingers on said arms, cam means pivotally mounted at the center of said tread plate movable by the tire as the tire is backed over the tread plate to engage and move said arms into position to grip the tire whereby the tire chain is wrapped around the tire as the tire is backed over the chain.

3. In a device for applying a tire chain to a tire, a tread plate, a pair of lever arms pivotally mounted on said tread plate, each of said lever arms comprising a pair of relatively movable members and spring means normally holding said members in fixed relation, means operated by the tire as it is backed over the tread plate to force said arms into position to grip the sides of the tire, said spring means compensating for a slight misalignment and means associated with said arms to engage and hold the ends of the tire chain so that it may be wrapped around the tire as the tire is backed over the chain.

4. In a device for applying tire chains, a tread plate, a pair of lever arms pivotally mounted on the opposite ends of the tread plate, tire chain engaging fingers on said arms, means associated with the tread plate movable by the tire as the tire is backed over the tread plate to force said arms into position to grip the tire, whereby the tire chain is wrapped around the tire as the tire is backed over the chain, said means being manually movable further in the same direction to release said arms and permit the removal of the device from the tire.

DENIS McKENNA.

REFERENCES CITED

The following references are of record in the file of this patent:

UNITED STATES PATENTS

| Number | Name | Date |
| --- | --- | --- |
| 1,308,153 | Wheat | July 1, 1919 |
| 1,499,036 | Smith | June 24, 1924 |
| 1,540,067 | Grimord et al. | June 2, 1925 |
| 2,166,869 | Lees et al. | July 18, 1939 |
| 2,445,947 | Hoppes | July 27, 1948 |
| 2,537,440 | Bradstreet | Jan. 9, 1951 |